United States Patent [19]

Iemura et al.

[11] Patent Number: 4,671,309

[45] Date of Patent: Jun. 9, 1987

[54] DEVICE FOR CONTROLLING CONCENTRATION OF A LIQUID DEVELOPING MACHINE

[75] Inventors: Shigeru Iemura, Kawasaki; Chiaki Ohigashi, Yokohama, both of Japan

[73] Assignee: Mitsushita Graphic Communication Systems, Inc., Tokyo, Japan

[21] Appl. No.: 750,588

[22] Filed: Jul. 1, 1985

[30] Foreign Application Priority Data

Jun. 29, 1984 [JP] Japan ..... 59-135665
Jun. 29, 1984 [JP] Japan ..... 59-135667
Feb. 5, 1985 [JP] Japan ..... 60-20366

[51] Int. Cl.[4] ..... G05D 11/02
[52] U.S. Cl. ..... 137/93; 118/691
[58] Field of Search ..... 137/93; 118/689, 690, 118/691; 354/298

[56] References Cited

U.S. PATENT DOCUMENTS

| | | | |
|---|---|---|---|
| 3,299,787 | 1/1967 | Kolb | 137/93 X |
| 3,381,662 | 5/1968 | Kolb et al. | 118/645 |
| 3,540,409 | 11/1970 | Lloyd | 118/672 |
| 3,548,855 | 12/1970 | Fathauer | 137/93 |
| 3,699,992 | 10/1972 | Knechtel | 137/93 |
| 3,739,800 | 6/1973 | Aasen | 137/93 |
| 4,119,989 | 10/1978 | Carvalko | 137/93 X |
| 4,222,497 | 9/1980 | Lloyd et al. | 222/57 |
| 4,224,154 | 9/1980 | Steininger | 137/93 X |
| 4,240,085 | 12/1980 | Tacklind | 346/153.1 |

FOREIGN PATENT DOCUMENTS

| | | | |
|---|---|---|---|
| 3138503 | 4/1983 | Fed. Rep. of Germany | 118/691 |

*Primary Examiner*—Robert G. Nilson
*Attorney, Agent, or Firm*—Wenderoth, Lind & Ponack

[57] ABSTRACT

An apparatus for controlling concentration of a liquid developer in a machine using liquid developer has a developer device for developing an electrostatic latent image by a liquid developer, a tank for containing the liquid developer having an inlet and an outlet, a liquid developer circulating pipe having a supply portion extending from the tank to the inlet and a discharge portion extending from the developer device to the tank, a vacuum pump in the discharge portion of the developer circulating pipe for circulating liquid developer from the tank through the developer device and returning it to the tank, a toner container for containing a concentrated toner liquid, a toner supply pipe having one end connected to the toner container and having the other end connected to the discharge portion of the liquid developer circulating pipe at a location between the developer device and the vacuum pump for supplying concentrated toner liquid to the tank, and a valve in the toner supply pipe for opening and closing the toner supply pipe.

6 Claims, 9 Drawing Figures

DEVICE FOR CONTROLLING CONCENTRATION OF A LIQUID DEVELOPING MACHINE

BACKGROUND OF THE INVENTION

1. Field of the Invention

The present invention relates generally to a liquid developing apparatus for developing an electrostatic latent image in facsimile machines, copying machines, printers or the like. In particular, the invention concerns a device or apparatus for controlling concentration in the liquid developing machine so that concentration of a liquid developer be constantly maintained to be constant.

2. Description of the Prior Art

In a facsimile machine and the like, an electrostatic latent image formed on a recording medium such as a sheet of paper is developed by a liquid developer having fine colored particles termed toner dispersed in a solvent to be thereby made visible. Repetition of development results in decreasing the quantity of toner in the solvent, lowering concentration of the developer. Accordingly, in order to maintain concentration of development (i.e. concentration of developer as well as density of developed image) in constant, it is necessary to supplement toner to the solvent in an appropriate manner. FIG. 1 of the accompanying drawing shows a typical one of the hitherto known developing machines equipped with a concentration controlling apparatus for maintaining constant the concentration of a liquid developer.

Referring to FIG. 1, the known liquid developing machine includes a lift pump 2 for feeding a developing liquid (also referred to as liquid developer) 3*a* contained in a tank 3 to a developing container 1 through a pipe 10. An electrostatic latent image on a recording sheet 8 is developed by the developing liquid fed to the developing container 1.

A pipe 11*a* is branched from the pipe 10 through which the developing liquid is fed upwardly and is equipped with a concentration detecting device 4 which is composed of a transparent pipe section 4*a* combined with a light emitting element 4*b* and a photoelectric sensor element 4*c* disposed on opposite sides of the transparent pipe section in diametrical opposition to each other. In the developing operation, the developing liquid 3*a* also flows through the branch pipe 11*a*, whereby concentration of the developing liquid is detected. The pipe 11*a* is connected to a toner supplementing apparatus composed of a Venturi tube 5, a valve 7 and a pipe 9. Under the pressure of the liquid developer 3*a* flowing through the pipe 11*a*, a negative pressure or vacuum is produced by the Venturi tube 5 so that a negative pressure prevails within the pipe 9. The other end of the pipe 9 is immersed in a pool of concentrated toner 6. Thus, when a valve 7 is closed, the concentrated toner 6 is supplementarily supplied to the tank or container 3 by way of the pipe 9, the Venturi tube 5 and a pipe 11*b*.

The concentration detecting device 4 and the valve 7 are connected to a concentration controlling circuit 26*a*. When the developing liquid flowing through the pipe 11*a* has attained a predetermined level of concentration, the concentration detector responds to activate the concentration controlling circuit 26*a* in such a manner that the valve 7 is opened. In this state, the ambient air flows through the valve 7, causing the supplementary supply of the concentrated toner 6 to be stopped. The concentration controlling circuit 26*a* is composed of an amplifier circuit for amplifying the output signal of the concentration detector 4, a comparator for comparing the amplified output signal of the concentration detector 4 with a reference voltage and an electromagnetic valve controlling circuit for controlling the closing and opening operations of an electromagnetic or solenoid valve 7 in dependence on the output signal of the comparator. More specifically, when the amplified output signal of the concentration detector 4 exceeds the predetermined reference voltage level in the comparison by the comparator, a control signal is supplied to the electromagnetic valve controlling circuit which responds thereto for producing a signal which triggers the opening or closing operation of the valve 7.

FIG. 2 is a timing chart for illustrating the timing in the operation described above. In the figure, the output signal of the amplifier circuit is shown at A, the reference voltage value is indicated by $V_O$, and the output signal of the electromagnetic valve controlling circuit is shown at B. During a period $T_O$ from the detection of a decrease in concentration of the liquid developer to the detection of an increase in concentration, the valve 7 is closed. As is shown in FIG. 2 at A, when the valve 7 is closed during the period $T_O$, the concentrated toner 6 is added to the developing liquid 3*a*, as the result of which the amount of light transmitted through the transparent pipe section 4*a* is decreased. Consequently, the output level of the detecting signal amplifying circuit is correspondingly lowered, indicating that concentration of the developing liquid 3*a* is increased.

The hitherto known liquid developing machine is however disadvantageous in that the negative pressure or vacuum can not be generated with high effiency or sensitivity due the such structure in which the Venturi tube 5 is connected in parallel with the developing container 1 on the discharge side of the lift pump 2 so that the negative pressure is produced upon flowing of the discharged liquid developer 3*a*. Further, disposition and connection of the Venturi tube and the pipes 10*a*, 11*a* and 11*b* involve a complicated structure, an increased size of the machine and an increased cost thereof.

Further, the concentration controller employed in the known liquid developing machine described above is so arranged as to actuate or close the valve 7 in response to detection of lowered toner concentration of the developing liquid to thereby cause the concentrated toner to be added to the developing liquid under the action of the Venturi tube, and upon detection of the toner concentration having reached the reference value, the valve 7 is actuated (opened) to stop the addition of the concentrated toner 6. With this arrangement, the concentrated toner flowing though the pipe 9, the Venturi tube 5 and the pipe 11 at the time when the valve is opened is supplied to the developer tank 3 in excess, which may bring about an excessively high density of the toner particles in the liquid developer 3*a*. As a consequence, background fog and condensation of toner particles often take place, which is a serious problem.

Further, when the known developing machine is left unused for a long time after a developing operation, solvent in the developing liquid sticking to the wall of the transparent pipe 4*a* of the concentration detector 4 will be evaporated, resulting in the toner being solidified on the wall so as to decrease the transmittivity of the transparent pipe section 4*a* below a nominal value. In that case, the amount of light impinging on the photoelectric sensor element 4*c* cannot be increased regardless of a decrease in concentration of the developing liquid, whereby addition of toner to the developing liquid does not take place. Then, concentration of the developing liquid is lowered below the nominal level, which is another disadvantage.

SUMMARY OF THE INVENTION

An object of the present invention is to overcome the problems of the prior art developing machine described above and to provide a liquid developing apparatus in which the Venturi tube can be omitted from the concentration controlling system and the piping arrangement can be simplified.

Another object of the present invention is to provide a liquid developing apparatus equipped with a concentration contol system which is capable of maintaining concentration (density of toner particles) of a developing liquid constantly at a correct or proper level or value.

A further object of the invention is to provide a device or apparatus for controlling concentration in a liquid developing machine in which concentration of the developing liquid can be detected with high accuracy and improved reliability even in the case where a device for detecting concentration of the developing liquid is provided in a liquid deloper supply pipe at an intermediate portion thereof.

To accomplish of the above and other objects which will be more apparent as description proceeds, it is proposed according to an aspect of the invention that a pressure reduction pump or vacuum pump be connected to a liquid developer circulating pipe for circulating a developing liquid between a storage tank and a developing container, wherein a pipe extending from a toner container containing concentrated toner liquid is connected to the vacuum pump at the suction side thereof, and a valve device (which may be operated manually or automatically) is installed in said pipe. With this structure, the concentrated toner liquid is supplementarily fed to the developer storage tank from the toner container under the pressure reduction action of the vacuum pump. Since a negative pressure or vacuum is produced at the suction side of the vacuum pump during operation thereof, it is not necessary to provide additional means for producing the negative pressure such as the Venturi tube, which means that the structure of the developing machine as the whole is correspondingly simplified, while the supplementary addition of the concentrated toner liquid can be accomplished with an enhanced efficiency. The valve device may be constituted by electromagnetic or solenoid valve or the like which can rapidly respond to the signal available from the output of a concentration detector, whereby the concentration control can be performed smoothly and uniformly. According to another aspect of the invention, the concentration controller used in combination with the liquid developing machine is provided with control means for responding to a signal supplied from the concentration detector to thereby actuate the valve device for supplying the concentrated toner liquid intermittently over a predetermined time span, whereby the supplementary supply of the concentrated toner is repeatedly performed on a bit-by-bit basis over the predetermined time span. In this manner, density of the toner particles dispersed in the developing liquid (i.e. concentration of the developing liquid) can be constantly maintained at a correct level. In a preferred embodiment of the present invention, that portion of the liquid developer supplying pipe where the concentration detecting means is disposed is additionally provided with means for constantly stagnating the liquid developer. By virtue of this arrangement, the concentration detecting portion or section of the liquid developer supplying pipe is always wetted by the liquid developer so as to prevent toner particles from being deposited in the solidified state at that portion, whereby detection of concentration can be achieved with an improved accuracy.

The above and other objects, features and advantages of the invention will be more apparent upon consideration of description of the preferred embodiments taken in conjunction with the accompanying drawings.

DESCRIPTION OF THE PREFERRED EMBODIMENTS

Figure 3:
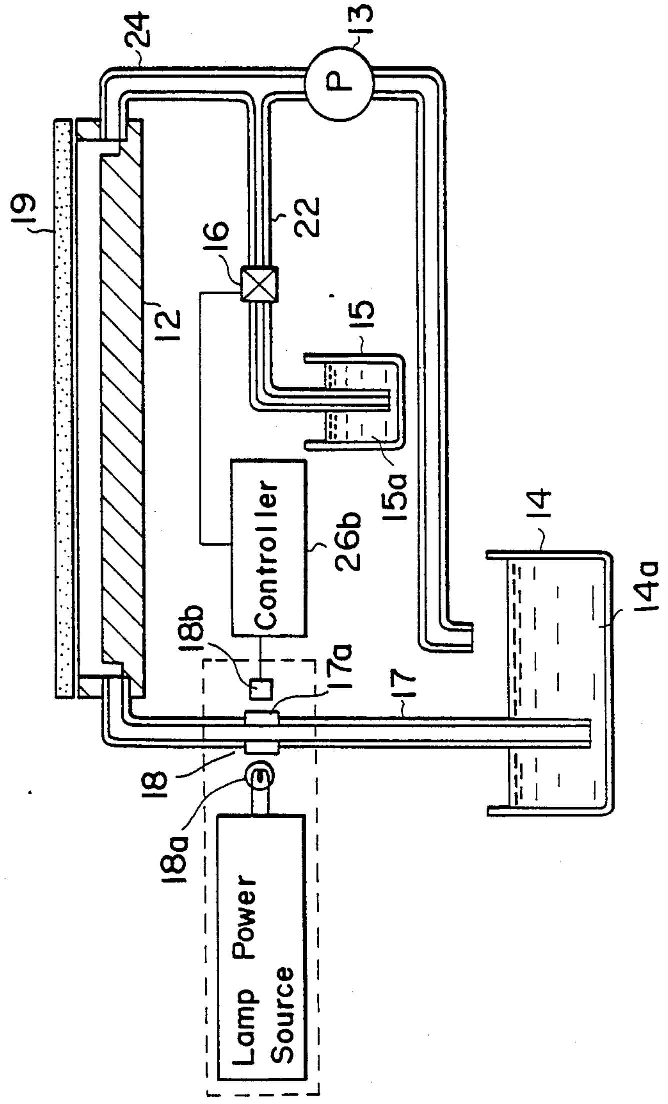
FIG. 3 is a view showing a general arrangement of the liquid developing machine or apparatus having a device for controlling concentration therein according to a first embodiment of the present invention.

Now, the invention will be described in detail in conjunction with embodiments thereof by referring to the drawings. FIG. 3 shows a general arrangement of the liquid developing machine having device for controlling concentration therein according to a first embodiment of the present invention, and FIGS. 4 and 5 are, respectively, a plan view and a perspective view showing a developing device employed in the apparatus shown in FIG. 3.

Referring to FIG. 3, a developing device or container 12 is connected to a suction or lift pipe 17 for lifting a liquid developer 14*a* from a liquid developer containing tank 14. The pipe 17 constitutes a part of the liquid developer circulating pipe system and is provided with a transparent section 17*a* in the vicinity of which a light emitting element 18*a* (a lamp in the case of the illustrated embodiment) and a photoelectric sensor 18*b* serving as a light receiving element are disposed to constitute a concentration detector 18 for detecting concentraion of the liquid developer.

Figure 4:
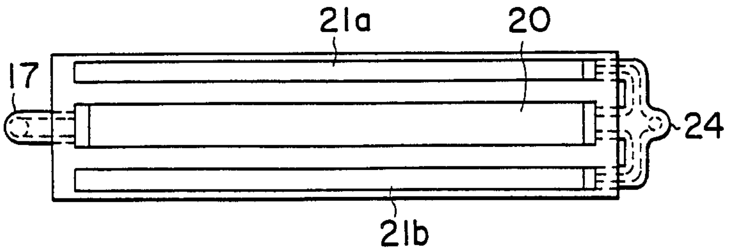
FIG. 4 is a plan view of the developing device and container used in the liquid developing machine shown in FIG. 3.
Figure 5:
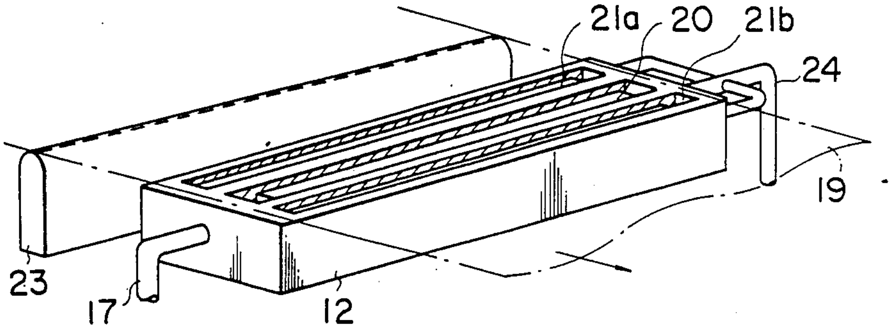
FIG. 5 is a perspective view of the same.

The developing device 12 includes a developing slit 20 and squeeze slits 21*a* and 21*b*, as shown in FIGS. 4 and 5, wherein one end (the lefthand end as viewed in the figure) of the developing slit 20 is connected to the lift or suction pipe 17. The other end of the slit 20 (right-hand end as viewed in the figure) is integrally combined with corresponding end portions of the squeeze slits 21*a* and 21*b* and connected to a pipe 24 for recovery of the liquid developer.

Referring to FIG. 5, a reference numeral 23 denotes an electrostatic head for forming an electrostatic latent image on an electrostatic type recording sheet 19.

Turning back to FIG. 3, the recovery pipe 24 is equiped with a vacum pump (P) 13. Under the action of this pump 13, the liquid developer 14*a* is withdrawn from the developing device or container 12 to be returned to the tank 14*a*.

A pipe 22 is branched from the recovery pipe 24 and has a free end portion immersed in a pool of a concentrated toner liquid 15*a*, so that the toner liquid 15*a* is lifted or sucked upwardly through the pipe 24 under a negative pressure produced by the vacuum pump 13. A reference numeral 15 denotes a toner container for storing therein the concentrated toner liquid 15*a*. The branch pipe 22 is provided with a valve device which may be constituted by a manually operated valve or an automatically operated valve. In the case of the illustrated embodiment, an electromagnetic or solenoid valve 16 is employed and constitutes a concentration controller in cooperation with the concentration detector 18 and a concentration control circuit 26*b* which cooperates with the concentration detector 18 as will be described hereinafter.

In the operation of the developing machine of the structure described above, an electrostatic latent image is first formed on the recording sheet 19 by means of the electrostatic head 23 shown in FIG. 5. Subsequently, the electrostatic type recording sheet 19 is transported in the direction indicated by an arrow by transporting means (not shown) to a position over the developing container 12.

At that time, the vacuum pump 13 is operated, whereby the pressure within the developing container 12 is reduced. As the result, the developing liquid 14*a* is lifted through the suction pipe 17 from the tank 14 to fill the developing container 12 with the liquid developer, whereby the electrostatic latent image on the recording sheet 19 is developed. The developing liquid 14*a* which toner has been removing during the development is returned to the tank 14 by way of the vacuum pump 13 and the recovery pipe 24.

The squeeze slits 21*a* and 21*b* of the developing container 12 are not connected to the suction pipe 17 but connected only to the vacuum pump 13, differing from the developing slit 20. Accordingly, no developing liquid 14*a* flows through the squeeze slits 21*a* and 21*b*, which are however in the pressure reduced state under the action of the vacuum pump 13. The excess developing liquid in deposited on the electrostatic type recording sheet which has reached the squeeze slit 21*b* is caused to be separated from the recording sheet 19 under the action of an air stream flowing between the developing container 12 and the recording sheet 19 and caught by the squeeze slit 21*b* to be returned to the liquid developer tank 14 by way of the vacuum pump 13. On the other hand, the recording sheet which has undergone development through the developing slit 20 has excess developing liquid removed upon passing through the squeeze slit 21*b* so that it can be transported in the dried state.

Needless to say, a continuous developing operation for a long time results in the concentration of the liquid developer being lowered, which is accompanied by a reduction density of the developed image, because of consumption of the toner particles in the liquid developer in the tank 14.

The concentration detector 18 serves to detect concentration of the developing liquid 14*a* flowing through the suction pipe 17 toward the developing container 12. More specifically, the developing liquid flowing through the pipe 17 is illuminated with the lamp 18*a*, and the light transmitted through the pipe section 17*a* and the liquid developer 14*a* is received by the photoelectric sensor 18*b*. When the amount of light received by the sensor 18*b* is increased beyond a predetermined reference value, the electromagnetic or solenoid valve 16 is opened under the control of the concentration control circuit 26*b*.

As described hereinbefore, operation of the vacuum pump 13 is started at the time when the recording sheet 19 is disposed on the developing container 12. When circulation of the developing liquid is thus started, the concentration detector 18 is activated to start the measurement of the amount of light transmission. When the amount of light transmission is large, it is decided that the developing liquid is too thin as compared with the reference concentration, resulting in a signal being supplied to open the solenoid valve 16. Since the branch pipe 22 pressure is reduced by the action of the vacuum pump 13, the concentrated toner liquid 15*a* is lifted through the branch pipe 22 from the toner container 15 to be supplied to the developing liquid tank 14. When concentration of the liquid developer 14*a* within the tank 14 is thus increased to attain the reference concentration, the amount of light transmission is decreased as compared with that obtained through the preceding measurement. This decrease in light transmission is detected by the concentration detector 18, whereupon the electromagnetic or solenoid valve 16 is closed under the control of the concentration control circuit. The supplying of toner is thus completed.

The operation described above is sufficient for practical application. However, in case the flow distance between the electromagnetic valve 16 and the developing liquid tank 14 is long and/or in case a relatively long time is taken before the electromagnetic valve 16 is closed in response to the detection of concentration through the detector 18 after the concentrated toner liquid is sufficiently mixed with the developer liquid within the tank 14, there may arise a situation in which an excessive amount of the concentrated toner liquid is added. Although no material problem arises at that time if the developing liquid tank 14 contains a sufficient amount of the liquid developer 14*a*, the rate of supply of the concentrated toner liquid becomes correspondingly high when the amount of the liquid developer in the tank 14 is decreased. To deal with this problem, it is preferred that the output signal of the concentration detector 18 be sampled periodically at a predetermined time interval to control the period during which the electromagnetic valve 16 is opened, when concentration becomes lower than the reference value, to thereby achieve more effective addition of the toner.

Figure 1:
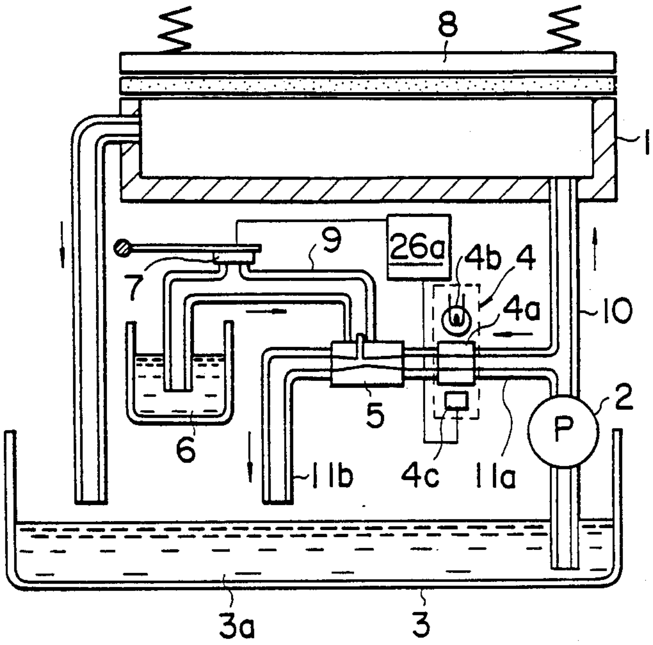
FIG. 1 (Prior Art)
FIG. 1 is a view showing schematically a structure of a hitherto known liquid developing apparatus.
Figure 2:
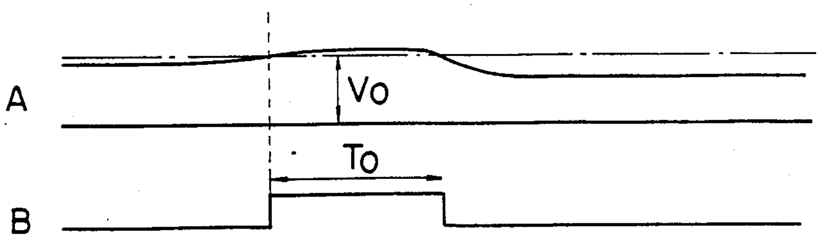
FIG. 2 (Prior Art)
FIG. 2 is a timing chart showing a developer concentration detecting signal and a valve control signal utilized in performing concentration control in a hitherto known liquid developing apparatus.
Figure 6:
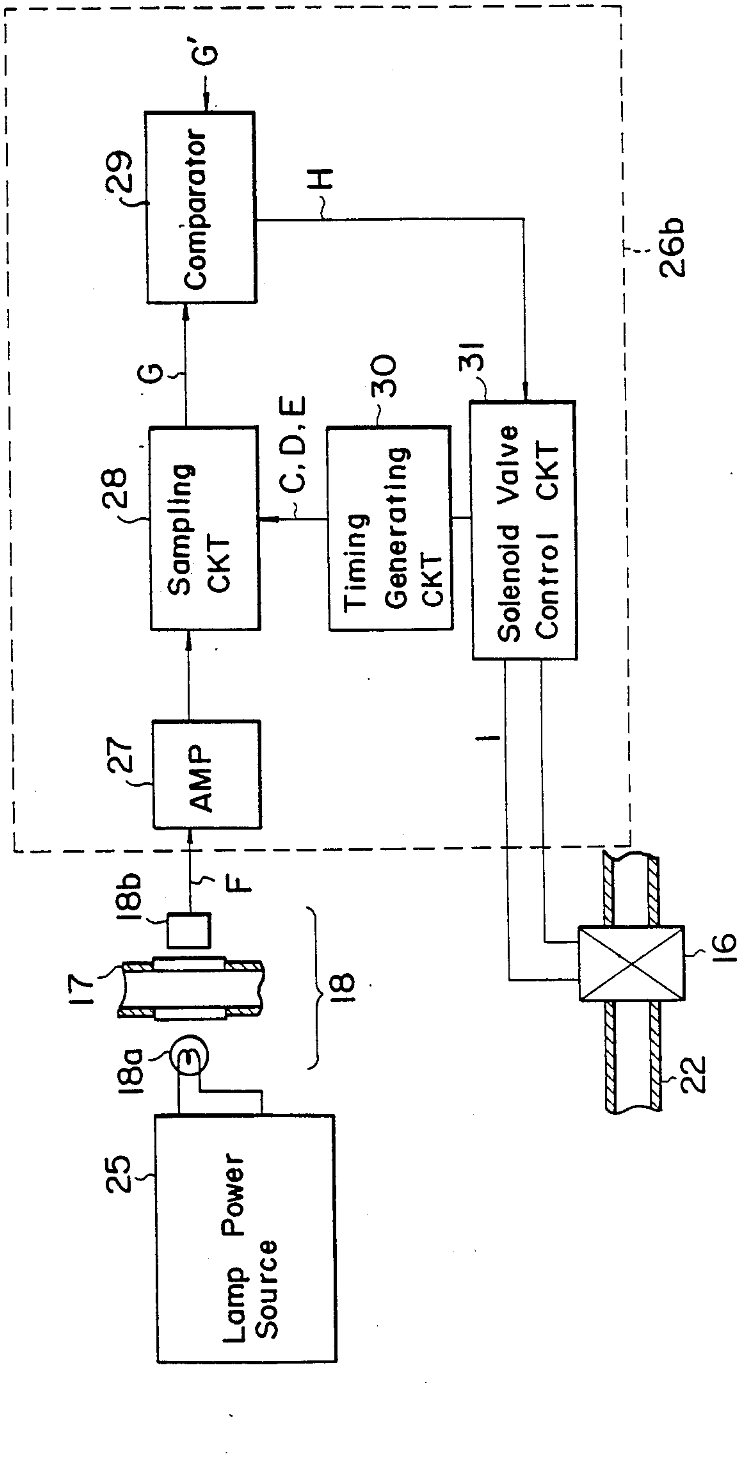
FIG. 6 is a block diagram showing the configuration of a concentration control circuit incorporated in the liquid developing apparatus according to the first embodiment of the present invention.

FIG. 6 shows in a block diagram a circuit configuration of a concentration control circuit 26*b* which is improved over the concentration control circuit 26*a* shown in FIG. 1. Referring to FIG. 6, a reference symbol 18*a* denotes a light emitting lamp, 25 denotes a lamp power source, 18*b* denotes a photoelectric sensor, 27 denotes a preamplifier for amplifying the output signal voltage of the photoelectric sensor, and 28 denotes a sampling circuit for sampling periodically at a predetermined time interval the output signal voltage of the sensor 18*b* after amplification through the amplifier 27. Further, a numeral 29 denotes a comparator circuit for comparing the output signal of the sampling circuit 28 with a reference voltage, 30 denotes a timing generator circuit for generating a timing signal for initiating the concentration control and a timing signal for the concentration detection, i.e. the timing signal for determining the sampling interval, and 31 denotes an electromagnetic valve control circuit which responds to the output signal of the comparator circuit for generating a control signal to open and close the electromagnetic or solenoid valve 16.

Operation of the concentration control circuit having the arrangement described above will now be described by also referring to FIG. 7 which shows a timing chart.

Figure 7:
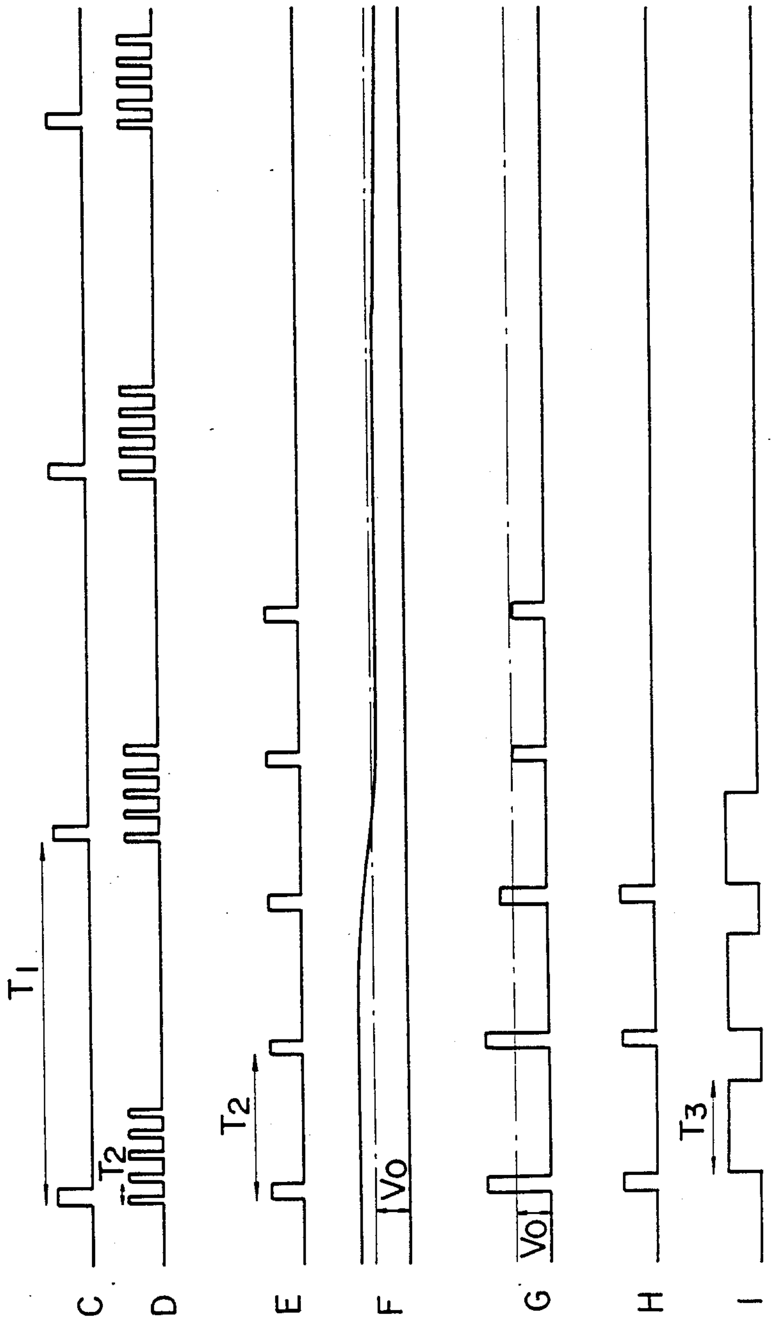
FIG. 7 is a timing chart for illustrating signals produced at various circuit points in the concentration control circuit shown in FIG. 6.

In FIG. 7, reference letters C and D designate two timing signal or periodical pulse signals generated by the timing generator circuit 30. The timing signal shown at C in FIG. 7 has a sufficiently long period $T_1$, while the timing signal illustrated at D is generated in synchronism with the leading edge of the timing pulse shown at C and includes a number of pulses (five pulses in the case of the illustrated embodiment) each having a shorter period $T_2$ than that ($T_1$) of the timing signal D.

The timing signal C determines the timing at which the control of concentration of the liquid developer is initiated, while the timing signal D determines the timing at which concentration of the developing liquid is to be detected and the timing at which the concentrated toner liquid is to be supplementarily added.

Light emitted from the illuminating lamp 18*a* is transmitted through the transparent section 17*a* of the suction or lift pipe 17 filled with the liquid developer 14*a*. In dependence on the amount of transmitted light, the output voltage signal is produced by the photoelectric sensor 18*b*. When the amount of transmitted light is large, i.e. when concentration of the liquid developer 14*a* becomes lower, the output voltage of the photosensor 18*b* is increased, and vice versa. The waveform of the output signal produced by the sensor 18*b* and amplified through the amplifier circuit 27 is illustrated in FIG. 7 at F. In this figure, $V_O$ represents a voltage value corresponding to the reference concentration value of the liquid developer. When the detection output signal of the amplifier circuit 27 is higher than the reference voltage $V_O$, this means that concentration of the liquid developer is lower than the reference concentration value, and vice versa.

A signal waveform resulting from the sampling of the voltage waveform F by using the pulse signal of the period $T_2$ shown at E (corresponding to D and shown in exaggerated form), i.e. the output signal waveform of the sampling circuit 28 is illustrated at G in FIG. 7. This signal G is compared with the reference voltage signal $V_O$ (represented by G' in FIG. 6) through the comparator circuit 29, as a result of which the pulse signal H produced when the signal G has a higher peak value than the reference voltage signal $V_O$ is supplied to the solenoid valve control circuit 31. In the control circuit 31, a pulse signal I of a period $T_3$ is generated in response to the signal H applied from the comparator circuit 29, whereby the electromagnetic or solenoid valve 16 is opened for a time duration corresponding to the period $T_3$. Thus, the concentrated toner liquid 15*a* is supplied to the liquid developer tank 14.

It should be noted that the time duration corresponding to the period $T_3$ of the pulse signal I is so set that a small amount of the concentrated toner liquid is supplied and that concentration of the liquid developer 14*a* does not exceed the reference value to any appreciable degree through a single addition of the toner during the period $T_3$. More specifically, after the concentrated toner liquid 15*a* is supplied during the period $T_3$, concentration of the liquid developer is measured again. At that time, if concentration as detected does not attain the reference level, the concentrated toner liquid 15*a* is again supplied for the period $T_3$. This operation is repeated until concentration of the liquid developer has attained the reference value.

As will be appreciated from the foregoing description, it is possible by means of to the illustrated embodiment of the invention to maintain concentration of the liquid developer (i.e. density of toner particles dispersed therein) constantly in the vicinity of the reference value without an excessive supply of the concentrated toner liquid even in case the amount of liquid developer is decreased due to the arrangement by which the concentrated toner adding means is actuated intermittently for a predetermined length of time for controlling concentration of the liquid developer in response to the detected concentration.

Figure 8:
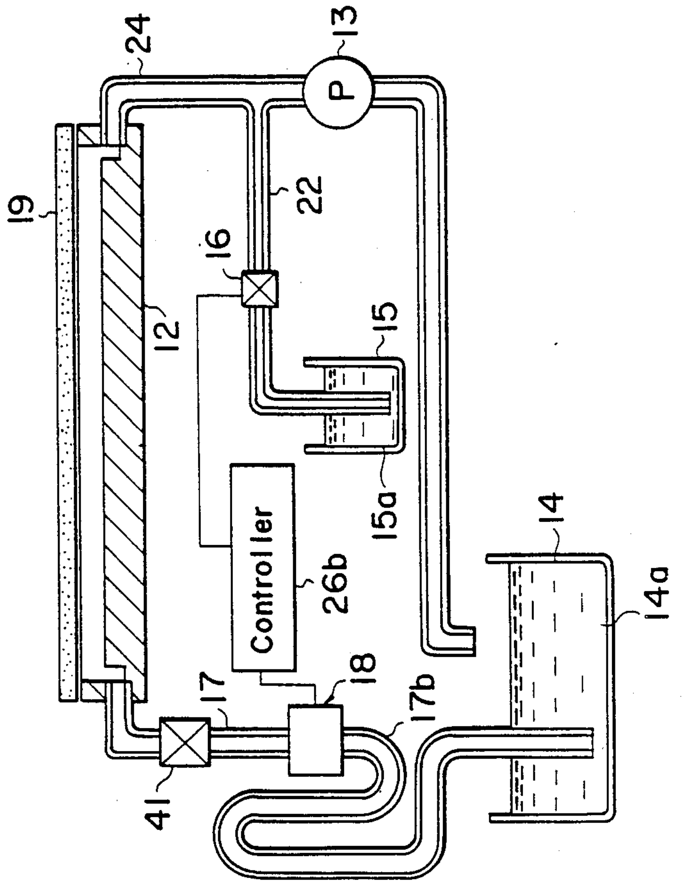
FIG. 8 is a schematic view of a structure of the liquid developing machine having device for controlling concentration therein according to a second embodiment of the present invention.

FIG. 8 shows a developing machine according to a second embodiment of the invention. In the liquid developing machine according to the instant embodiment, the concentration detector 18 constituting the means for detecting concentration. of the liquid developer is arranged in the liquid developer suction pipe 17 at an intermediate portion which constitutes a part of a U-like pipe section 17*b* constituting a trap serving as a liquid developer stagnating means. Further, a normally closed solenoid (electromagnetic) valve 41 is installed in the suction pipe 17 at a position downstream of the concentration detector 18. Of course, it is possible to install the concentration detector 18 at a portion of the pipe 17 rising from the developer tank 14 or at the bottom of the U-like pipe section 17*b*.

Upon completion of development, the electromagnetic valve 41 is first closed, whereby the lifting or suction of the liquid developer 14*a* from the tank 14 is stopped. Subsequently, the liquid developer remaining within the developing slit 20 of the developing container 12 is returned to the tank 14 through the recovery pipe 24 under the suction exerted by the vacuum pump 13, which is followed by the stoppage of the vacuum pump 13.

Since the liquid developer remains in the U-like pipe section 17*b* of the liquid lifting pipe 17 even after the lifting of the developer liquid through the suction pipe 17 is stopped with the recovery of the liquid developer through the recovery pipe 24 also being terminated, the inner wall of the transparent pipe section 17*a* within the concentration detector 18 is always wetted with the developing liquid, to prevent the toner contained in the liquid developer from being deposited on the wall of the transparent pipe section in the dried state. Further, since the electromagnetic valve 41 disposed downstream of the U-like pipe section 17*b* closes the suction pipe 17 at the top portion thereof at the end of the developing process, the liquid developer remaining within the suction pipe 17 is protected from vaporization, which in turn assists in preventing deposition of the toner on the inner wall of the pipe in dried state. Accordingly, where the developing machine is not left unused for such an extended time that the liquid developer remaining in the upper portion of the suction pipe downstream of the electromagnetic valve 18 is all vaporized, the electromagnetic valve 41 may be omitted.

Figure 9:
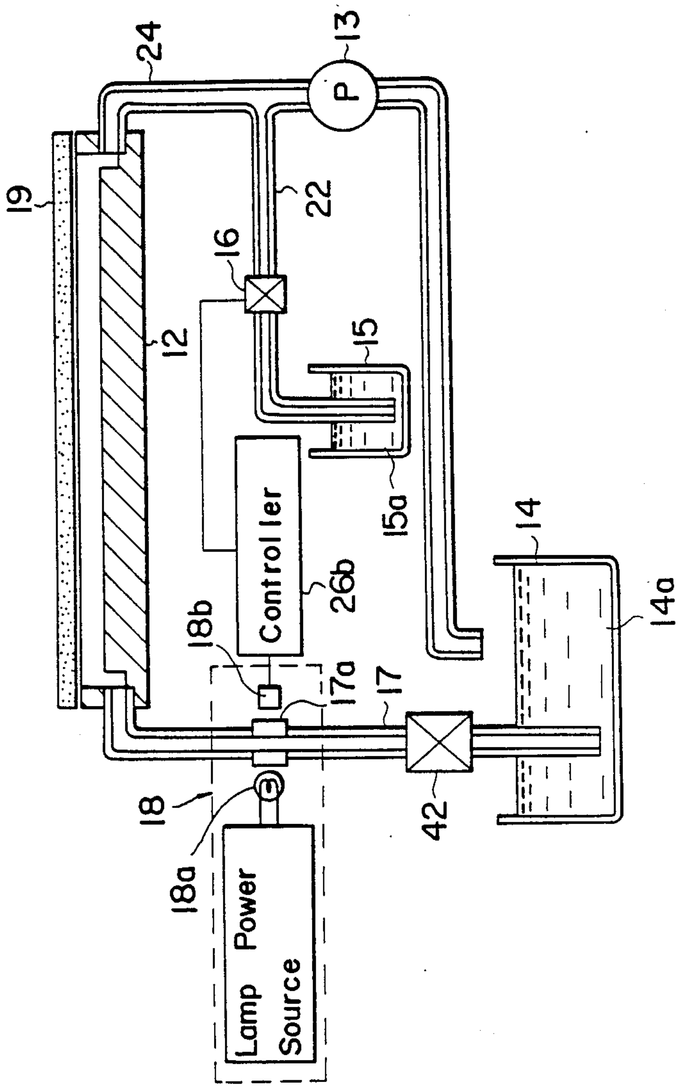
FIG. 9 is a schematic view showing a structure of the liquid developing machine having device for controlling concentration therein according to a third embodiment of the present invention.

FIG. 9 shows a developing machine according to a third embodiment of the present invention. In the case of this embodiment, a normally closed electromagnetic valve 42 is installed in the suction pipe 17 having a straight configuration at a location upstream of the concentration detector 18. By closing the electromagnetic valve 42 upon completion of a development process, the liquid developer can be held within the portion of the suction pipe 17 located downstream of the electromagnetic valve 42, whereby deposition of toner on the transparent pipe section 17*a* within the concentration detector 18 due to evaporation of the solvent of developer can be prevented. In the case of the instant embodiment, an electromagnetic valve 41 similar to the valve 41 shown in FIG. 8 can be disposed on the suction pipe 17 at a location downstream of the concentration detector 18.

In each of the embodiments of the invention described above, a transmission type photoelectric sensor device is employed as the concentration detector. It can be understood . that a reflection type sensor may also be used to this end.

In the case of the second and third embodiments of the invention, the transparent wall section of the pipe within the concentration detecting means is constantly wetted with the developing liquid, whereby toner deposition on the that portion of the pipe due to vaporization of the solvent of the liquid developer can be positively prevented or suppressed. In both the second and third embodiments, other constitutent components are same as or equivalent to those of the first embodiment and denoted by like reference symbols. Repetition of a detailed description of these components is unnecessary.

Although the invention has been described in detail in conjunction with what is presently believed to be the preferred embodiments, it should be understood that many variations and modifications will readily occur to those skilled in the art without departing from the spirit and scope of the invention. It is intended that the variations and modifications be covered by the invention set forth in the claims.

What is claimed is:

1. An apparatus for controlling concentration of a liquid developer in a machine using liquid developer, comprising:

developing means for developing an electrostatic latent image by liquid developer and having a developer inlet and developer outlet;

a tank for containing the liquid developer;

a liquid developer circulating pipe having a supply portion extending from said tank to said inlet and a discharge portion extending from said outlet to said tank;

a vacuum pump in said discharge portion of said developer circulating pipe for circulating liquid developer from said tank through said developing means and returning it to said tank;

a toner container for containing a concentrated toner liquid;

a toner supply pipe having one end connected to said toner container and having the other end connected to said discharge portion of said liquid developer circulating pipe at a location between said developing means and said vacuum pump for supplying concentrated toner liquid to said tank;

valve means in said toner supply pipe for opening and closing said toner supply pipe;

concentration detecting means disposed in said liquid developer circulating pipe upstream of the point at which said toner supply pipe is connected to said liquid developer circulating pipe for detecting the concentration of the liquid developer, and a concentration control circuit connected between said concentration detecting means and said valve means for controlling the opening and closing of said valve means in response to an output signal produced from said concentration detecting means; and a stop valve in said liquid developer circulating pipe upstream of the location of said concentration detecting means for causing liquid developer to remain in the portion of said liquid developer pipe in which said concentration detecting means is located after said pump is stopped.

2. An apparatus as claimed in claim 1 in which said valve means is an electromagnetic valve.

3. An apparatus as claimed in claim 1 in which said concentration control circuit comprises means for comparing the output signal of said concentration detecting means with a predetermined reference value signal, and means for controlling the opening and closing of said valve means in dependence on the output of said concentration detecting means, said valve means being opened when the output signal indicates that the concentration of said liquid developer is lower than a concentration corresponding to said reference value signal.

4. An apparatus as claimed in claim 3 in which said concentration control circuit further includes means for producing a timing signal for initiating and terminating the control of concentration of the liquid developer and a further timing signal for intermittently opening and closing said valve means in response to said further timing signal during the time said firstmentioned timing signal has initiated control of the concentration for causing the concentrated toner liquid to be intermittently supplied.

5. An apparatus as claimed in claim 4 in which said valve means is an electromagnetic valve.

6. An apparatus as claimed in claim 1 in which said means comprises a substantially U-shaped trap upstream of the location of said concentration detecting means.

* * * * *